United States Patent
Patel et al.

(10) Patent No.: US 8,203,954 B1
(45) Date of Patent: Jun. 19, 2012

(54) LINK POLICY ROUTING BASED ON LINK UTILIZATION

(75) Inventors: Rahul G. Patel, Nashua, NH (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 934 days.

(21) Appl. No.: 11/337,217

(22) Filed: Jan. 20, 2006

Related U.S. Application Data

(60) Provisional application No. 60/679,184, filed on May 9, 2005.

(51) Int. Cl.
*H04J 3/14* (2006.01)
(52) U.S. Cl. ........................................ 370/235; 370/359
(58) Field of Classification Search .................. 370/229, 370/235, 238
See application file for complete search history.

(56) References Cited

U.S. PATENT DOCUMENTS

| | | | |
|---|---|---|---|
| 6,424,624 B1 | 7/2002 | Galand et al. | |
| 6,493,317 B1 | 12/2002 | Ma | |
| 6,724,722 B1 * | 4/2004 | Wang et al. | 370/229 |
| 6,778,495 B1 | 8/2004 | Blair | |
| 6,862,624 B2 | 3/2005 | Colby et al. | |
| 6,934,293 B1 | 8/2005 | DeJager et al. | |
| 2005/0210534 A1 * | 9/2005 | Krishnamurthy | 726/23 |
| 2006/0002297 A1 * | 1/2006 | Sand et al. | 370/235 |
| 2006/0067217 A1 * | 3/2006 | Li et al. | 370/230 |
| 2006/0165009 A1 * | 7/2006 | Nguyen et al. | 370/252 |

OTHER PUBLICATIONS

Feldmann; Deriving Traffic Demands for Operational IP Networks: Methodology and Experience ; IEEE/ACM Transactions on Networking, vol. 9, No. 3, Jun. 2001.*
U.S. Appl. No. 60/679,184, filed May 9, 2005, entitled Systems and Methods for Use With Optimized Edge Routing, by Blair et al.
Perlman, Radia, "Interconnections Second Edition: Bridges, Routers, Switches, and Internetworking Protocols", Sections 12.1-12.3 pp. 299-321, Addison Wesley Longman, Inc. 2000.
Rekhter, Y. et al., RFC 1771, "A Border Gateway Protocol 4 (BGP-4)", Network Working Group, Mar. 1995, pp. 1-54.
"NetFlow Services Solutions Guide", Oct. 2004, pp. 1-72, Cisco Systems, Inc.
"NetFlow v9 Export Format", Cisco IOS Release, 2003, pp. 1-22, Cisco Systems, Inc.
U.S. Appl. No. 10/980,550, filed Nov. 3, 2004, entitled Method and Apparatus for Automatically Optimizing Routing Operations at the Edge of a Network, by Shah et al.
U.S. Appl. No. 11/113,629, filed Apr. 25, 2005, entitled Active Probe Path Management, by Blair at al.
U.S. Appl. No. 11/113,582, filed Apr. 25, 2005, entitled Active Probe Target Management, by Metzger et al.
U.S. Appl. No. 11/239,613, filed Sep. 29, 2005, entitled Technique for Maintaining and Enforcing Relative Policies With Thresholds, by Xia et al.
United States Patent Application No., filed Jan. 20, 2006, entitled Link Grouping for Route Optimization, by Pritam Shah.

* cited by examiner

*Primary Examiner* — Donald Mills
*Assistant Examiner* — Henry Baron
(74) *Attorney, Agent, or Firm* — Cesari and McKenna, LLP

(57) ABSTRACT

A technique dynamically applies a link utilization based policy to traffic traversing links in a computer network. According to the novel technique, a link utilization threshold is assigned to one or more links. The link utilization threshold may be, for example, a maximum amount of traffic for an individual link, or a maximum difference between links (e.g., for load balanced traffic). The link utilization of the one or more links may be monitored, such as, e.g., by an optimized edge routing (OER) process. In the event that the link utilization surpasses the threshold, the link is considered to be out-of-policy (OOP), and traffic may be redirected to other available links accordingly in order to bring the link back in policy ("IN-POLICY").

19 Claims, 7 Drawing Sheets

LINK POLICY TABLE 300

| LINK ID 305 | LINK UTILIZATION THRESHOLD 310 | LOAD BALANCED LINKS 315 |
|---|---|---|
| LINK 1 | 75% | N/A |
| LINK 2 | 80% | N/A |
| ⋮ | ⋮ | ⋮ |
| LINK 3 | 20% GREATER | LINK 4 |
| LINK 4 | 20% GREATER | LINK 3 |
| ⋮ | ⋮ | ⋮ |
| LINK N | 85 KBps | N/A |
| LINK N | 20% GREATER | LINKS Y, Z |
| LINK N | 15 KBps GREATER | LINK X |
| LINK X | 25% GREATER | LINK N |
| ⋮ | ⋮ | ⋮ |

ENTRIES 320

FIG. 3

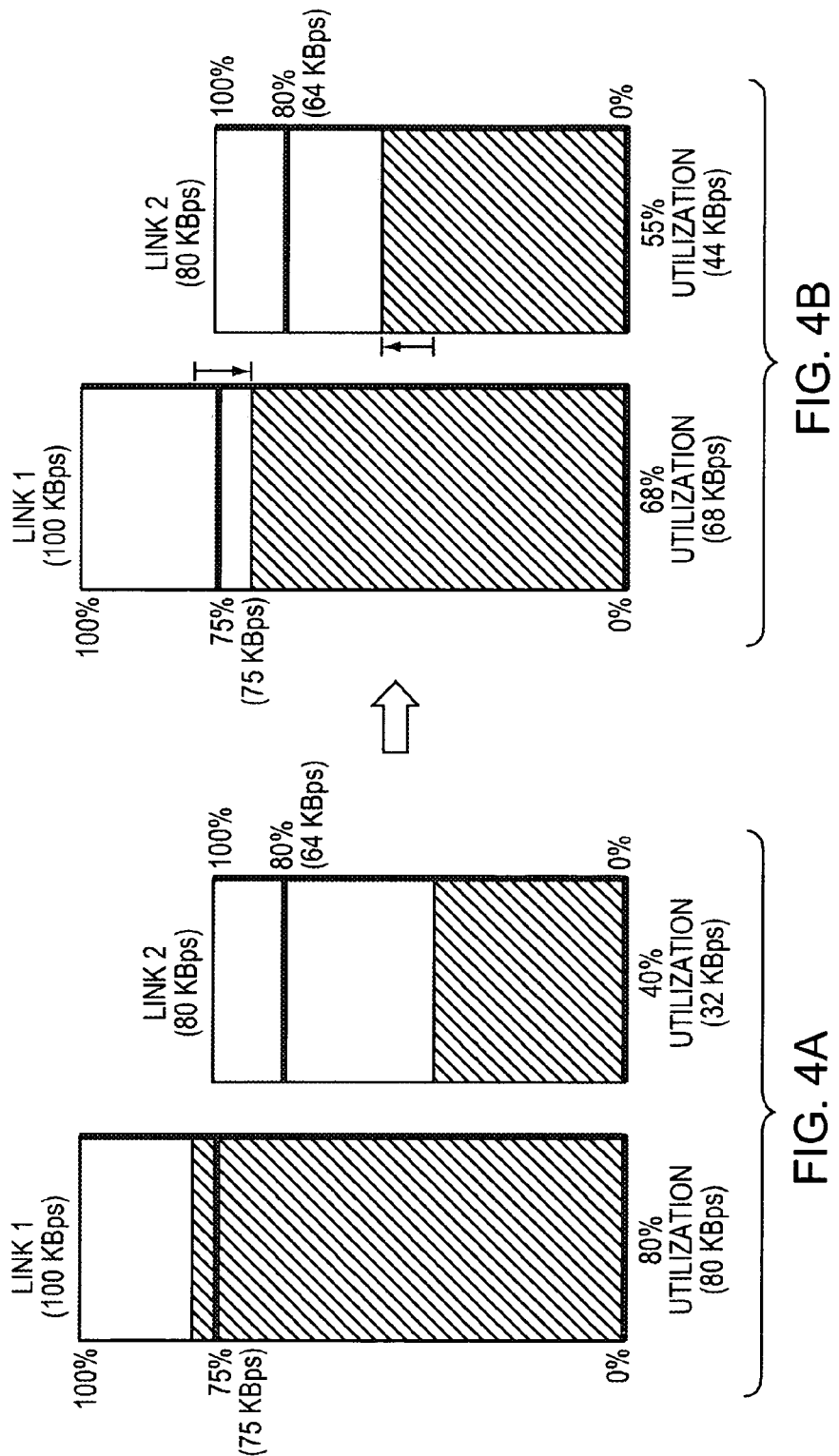

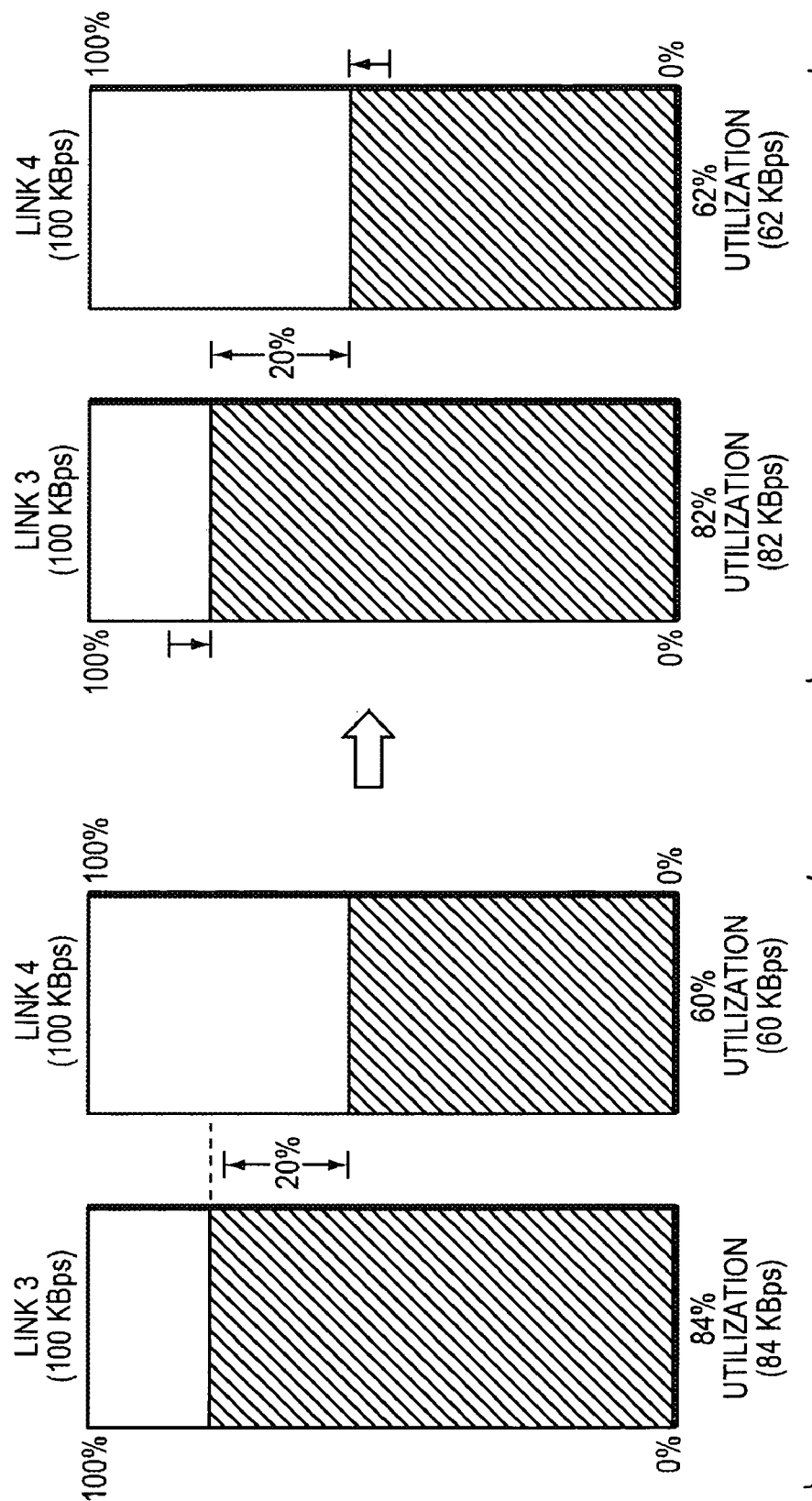

LINK POLICY ROUTING BASED ON LINK UTILIZATION

RELATED APPLICATION

This application claims the benefit of U.S. Provisional Application Ser. No. 60/679,184, entitled SYSTEMS AND METHODS FOR USE WITH OPTIMIZED EDGE ROUTING, filed by Blair et al. on May 9, 2005, the contents of which are hereby incorporated in its entirety.

BACKGROUND OF THE INVENTION

1. Field of the Invention

The present invention relates to computer networks and more particularly to link policy routing based on link utilization in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node" or "border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric is with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The BGP protocol generally facilitates policy-based routing in which an administrative entity places restrictions on inter-AS routing operations. For example, the administrator of a company's AS may employ a BGP routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the BGP policies rely on AS path-vector information. More specifically, the BGP protocol enables a plurality of interconnected ASes to exchange network topology information. Using this topology information, each AS can derive "paths" to the other reachable ASes, each path defining a logical sequence of ASes. For example, a path between an AS1 and an AS3 may be represented by the sequence {AS1, AS2, AS3} when only AS2 intervenes. Based on the content of these AS sequences, the BGP protocol may filter those paths that do not coincide with the administrator's policies. As such, inter-AS routing operations are performed using only the "best paths" that satisfy the BGP policies.

Because BGP policies are applied to sequences of ASes, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple ASes. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAs) associated with connections to the ISP. Ultimately, the end result for the enterprise network is improved Internet performance, better load distribution, and/or lower costs for Internet connections. These additional procedures may require the border nodes (OERs) to collect various network statistics associated with the data flows. An exemplary software application that may be used to collect the network statistics at the border nodes is NetFlow™ by Cisco Systems, Incorporated, which is described in more detail in the technical paper entitled *Netflow Services Solutions Guide*, published September 2002, and is hereby incorporated by reference as though fully set forth herein.

Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as virtual private networks (VPN) implemented over multiple physical interfaces. Each node stores address prefixes and statistics for the monitored data flows, which may be periodically exported to a central management node (e.g., a "collector" or "Master"). The central management node is configured to receive prefixes and statistics from a plurality of different network nodes. A record format that may be used to export the raw prefixes and statistics is described in the technical paper entitled *Netflow v9 Export Format*, which is hereby incorporated by reference in its entirety. Further, a more sophisticated interaction (e.g., a filtered and/or pre-processed information exchange) between border nodes and a Master node is described in commonly owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety.

Active probing, on the other hand, relies on probe packets to measure various parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

Once the relevant statistics are obtained (e.g., at the central management node), the collected parametric (performance) information (i.e., learned from passive monitoring or active probing) is analyzed, such as either manually by a network administrator or dynamically by a software script. The analyzed information may then be used to select an OEL from among the different exits that may be used to reach the destination prefix, and/or to determine whether the data flows may be more optimally distributed. For instance, suppose an administrator desires to make more efficient use of available network bandwidth and determines that a first network interface is under-utilized and a second interface is oversubscribed. In this case, at least some data flows at the second interface may be redirected to the first interface. To effectuate such a routing change, the administrator may, for example, make static changes to the routing tables at the first and second interfaces or may re-assign local-preference values (or other priority values) associated with the data flows.

Currently, to determine whether certain links are under- or over-utilized, the administrator manually examines the data flows and decides whether to redirect traffic. Conventional dynamic routing protocols, including OER, may select the best link for one or more prefixes in real time. Often, however, the best link (e.g., an OEL) for a particular prefix may also be the best link for many other prefixes, such as, e.g., where any of the cost, delay, jitter, etc. are more favorable to that link than to other links. Because of this, the best link may quickly become congested and over-utilized without administrator intervention. Once 100% utilization capacity is reached (e.g., 100 Kilobytes per second, KBps, of traffic over a 100 KBps link), packets within the data flow may be dropped, delayed, etc. Upon learning of the loss, delay, etc. of the selected best link, the routing protocols may no longer select that link as the best, and may move the traffic to other link with less loss, delay, etc. (e.g., as is the case with OER). This process is sub-optimal, in that it allows packets to be dropped or delayed before any action is performed, if any action is performed at all.

Further, while there are existing means for balancing traffic across a plurality of links, none of the current means are adaptive to the actual (and real time) traffic and/or utilization of the links. For instance, packet based or flow based load balancing generally requires that the plurality of links have equal costs. Although this may be useful for various network configurations (e.g., core networks), the scalability of these means is limited.

There remains a need, therefore, for a technique that prevents a link from reaching its utilization capacity, thus reducing the number of dropped packets and delay over the link. Also, there remains a need for a technique that proportionally load balances traffic across a plurality of links in the case where links have unequal properties (costs/capacities, etc.), and that is adaptive to the flow of traffic.

SUMMARY OF THE INVENTION

The present invention is directed to a technique for dynamically applying a link utilization based policy to traffic traversing links in a computer network. According to the novel technique, a link utilization threshold is assigned to one or more links. The link utilization threshold may be, for example, a maximum amount of traffic for an individual link, or a maximum difference between links (e.g., for load balanced traffic). The link utilization of the one or more links may be monitored, such as, e.g., by an optimized edge routing (OER) process. In the event that the link utilization surpasses the threshold, the link is considered to be out-of-policy (OOP), and traffic may be redirected to other available links accordingly in order to bring the link back in policy ("IN-POLICY").

In accordance with one aspect of the present invention, a link utilization threshold is assigned to each individual link that is, e.g., a percentage of the total capacity of the link, an absolute bandwidth value, etc. The link utilization is monitored, and if the utilization is above the threshold, the link is considered to be OOP. Excess utilization for an OOP link may be reduced by changing the routes of one or more selected prefixes, i.e., to use other available links. Notably, care may be taken so as to avoid "blackholing" prefixes, as will be understood by those skilled in the art.

In accordance with another aspect of the present invention, a load balancing link utilization threshold (or range) is assigned to one or more links that is, e.g., a percent difference between other selected links ("load balanced links") (e.g., a percentage of the total capacity of a link that is greater than that of another link by a configurable amount), an absolute bandwidth difference (e.g., a configurable amount of used bandwidth greater than that of another link), etc. The load balancing link utilization is monitored, and if the utilization surpasses the threshold for a link, that link is considered to be OOP, and prefix routes may be changed accordingly. Optionally, the route changes may be configured to bring the link utilization of the selected load balanced links as close to equal/proportional as desired (e.g., percent usage or absolute bandwidth), or instead configured to simply reduce the difference to below the configured threshold.

Advantageously, the novel technique dynamically applies a link utilization based policy to traffic traversing links in a computer network. By defining link utilization thresholds, the novel technique dynamically prevents a link from reaching its utilization capacity, thus reducing the number of dropped packets and delay over the links. Also, by defining load balancing thresholds, the novel technique may proportionally load balance traffic based on link capacity, especially in the case where links have unequal capacities, where other current methods fail. Further, the novel technique is adaptive to the flow of traffic and does not depend upon traditional (and often cumbersome) routing techniques to load balance traffic among a plurality of unequal links (e.g., in capacity and/or cost).

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is an exemplary link policy table that may be used in accordance with the present invention;

FIGS. 4A-4B are graphical representations of link utilization and link policy for individual links in accordance with the present invention;

FIGS. 5A-5C are graphical representations of link utilization and link policy for load balanced links in accordance with the present invention.

DETAILED DESCRIPTION OF AN ILLUSTRATIVE EMBODIMENT

Figure 1:
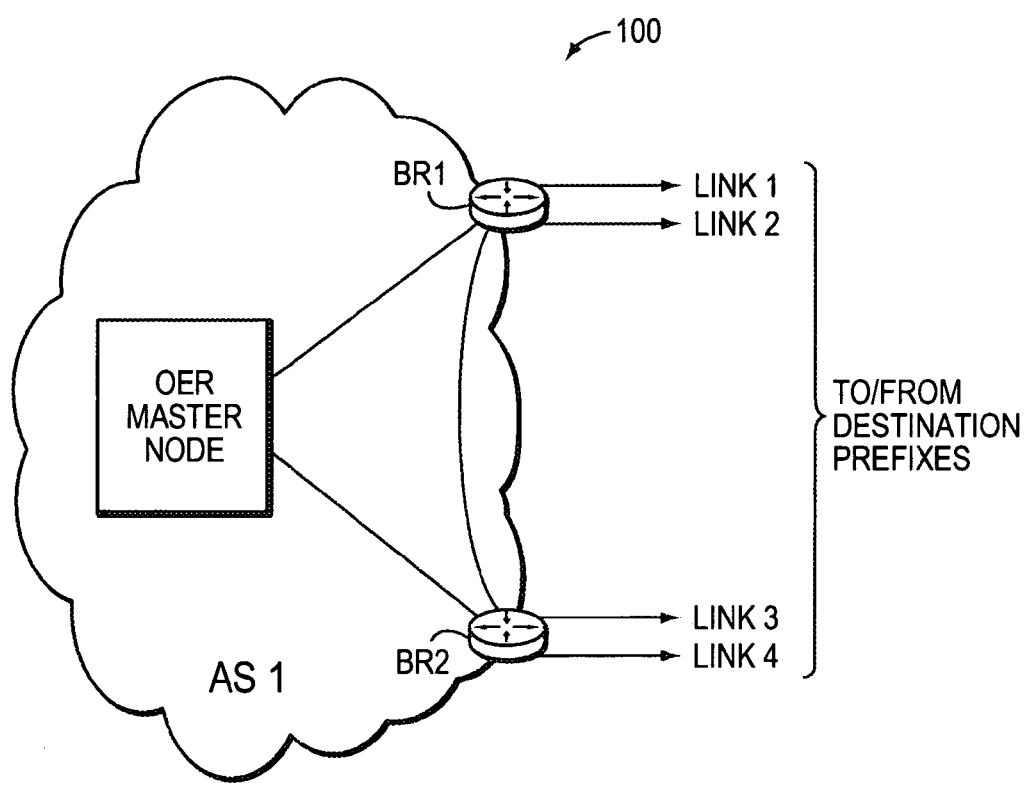
FIG. 1 is a schematic block diagram of an exemplary computer network that may be advantageously used with the present invention.

FIG. 1 is a schematic block diagram of an exemplary computer network 100 comprising an autonomous system (AS) AS1 (e.g., an enterprise or content provider network) interconnected to one or more destination prefixes (e.g., within one or more content consumer networks). Although AS1 is illustratively an autonomous system, those skilled in the art will appreciate that AS1 may be configured as one or more routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1-BR2 permit communication from AS1 to/from destination prefixes (e.g., via a wide area network, or WAN), such as through illustrative exits ("links") 1 and 2 on BR1, and links 3 and 4 on BR2. Routing operations at the border nodes BR1-BR2 may be managed by an optimized edge routing (OER) "Master" node, which may be connected to the border nodes by, e.g., point-to-point links or a local area network. Also, BR1-BR2 may be in communication with each other, such as through illustrative links as shown. These examples are merely representative. Those skilled in the art will understand that any number of routers, nodes, links, and exits may be used in the computer network and connected in a variety of ways, and that the view shown herein is for simplicity.

Data packets may be communicated by the AS and destination prefixes using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among ASes using "external" gateway protocols, such as the Border Gateway Protocol (BGP).

Figure 2:
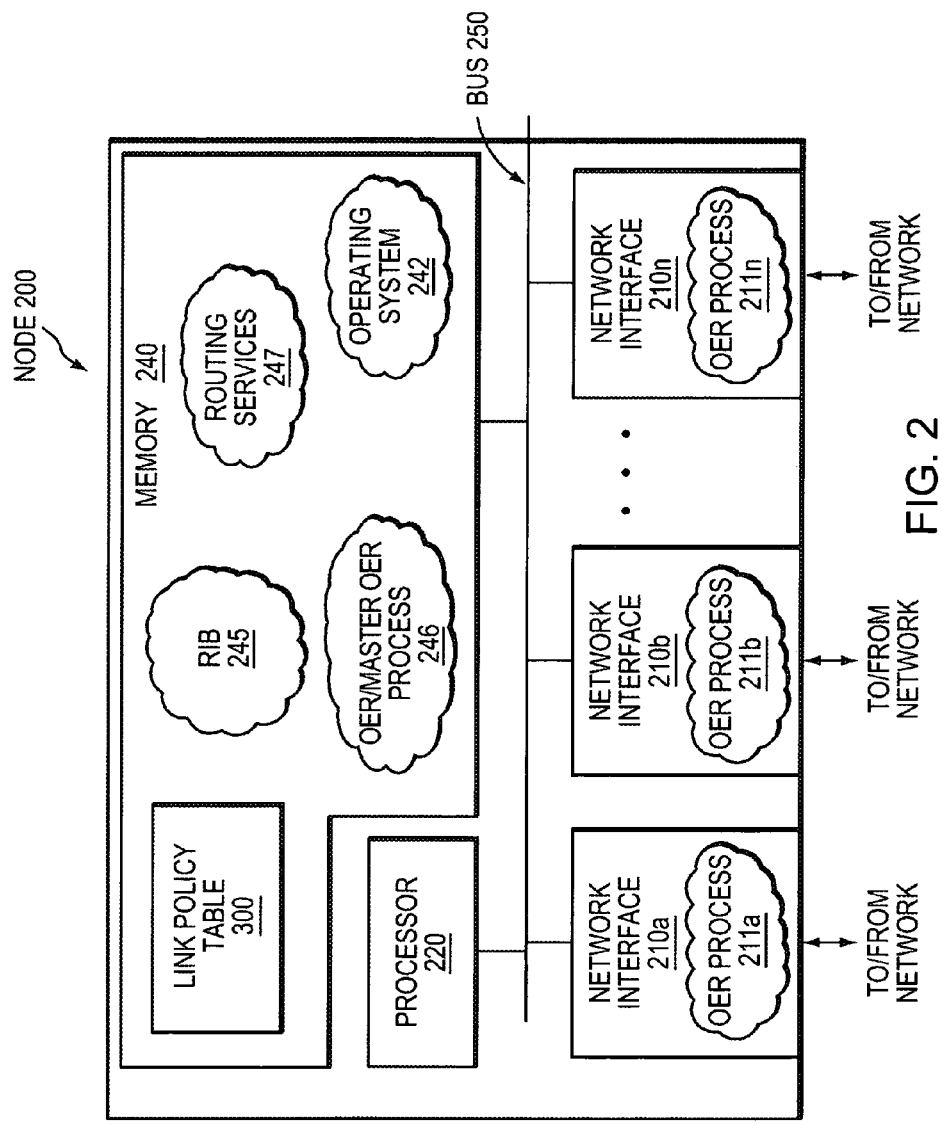
FIG. 2 is a schematic block diagram of an exemplary node that may be advantageously used with the present invention.

FIG. 2 is a schematic block diagram of an exemplary node 200 that may be advantageously used with the present invention, such as, e.g., a border node (e.g., an edge router) or a master node. The node comprises a plurality of network interfaces 210*a-n* (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits" or "links."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as link policy table 300. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as to IGP or BGP, in order to compute best paths/routes for installation into the routing table (not shown).

According to the illustrative embodiment of the present invention, the OER/Master OER Process 246 is employed by an OER node (e.g., border routers BR1-BR2) and an OER Master node (e.g., an OER Master router or Master Controller), respectively. The Master OER process 246 executing on the OER Master node communicates with border routers BR1-BR2 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211*a-n* configured to measure various types of network statistics acquired from monitored traffic. These statistics are then forwarded from the OER processes 211*a-n* to the OER process 246. The statistics may correspond to various traffic measurements, such as round-trip delay times, data throughput (i.e., the amount of data transferred or received), packet loss, reachability, etc. In general, the OER processes (notably, 246 and/or 211*a-n*) may measure any arbitrary traffic metric, including conventional cost-based and distance-based metrics. Further, the OER Process 246 and/or 211*a-n* may calculate statistical averages, variances, medians, etc. of a collection of traffic measurements.

Techniques for learning address prefixes and collecting traffic statistics (passively monitoring) are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, techniques for actively probing (managing paths and targets of active probe packets) are described in commonly-owned copending U.S. patent application Ser. No. 11/113,629, entitled ACTIVE PROBE PATH MANAGEMENT, filed by Blair et al. on Apr. 25, 2005, and commonly owned copending U.S. patent application Ser. No. 11/113,582, entitled ACTIVE PROBE TARGET MANAGEMENT, filed by Metzger et al. on Apr. 25, 2005, the contents of both of which are hereby incorporated in their entirety.

The statistics from the OER Process 246 and/or 211*a-n* are then processed at the Master node in accordance with the Master OER process 246. More specifically, the Master OER process 246 analyzes the statistics and determines whether the distribution of traffic entering and/or leaving the AS1 can be optimized, e.g., according to one or more policies. If so, the Master OER process may redistribute traffic routed through the border nodes by, e.g., associating new BGP local-preference values with selected traffic or statically changing the routing table contents of the border nodes, as described in detail below. In that sense, the Master OER process selects optimal exit links (OELs) ("best exits") to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office router) having multiple exits/paths may both monitor the quality of its exits and select the OEL itself.

The present invention is directed to a technique for dynamically applying a link utilization based policy to traffic traversing links in a computer network. According to the novel technique, a link utilization threshold is assigned to one or more links. The link utilization threshold may be, for example, a maximum amount of traffic for an individual link, or a maximum difference between links (e.g., for load balanced traffic). The link utilization of the one or more links may be monitored, such as, e.g., by an optimized edge routing (OER) process. In the event that the link utilization surpasses the threshold, the link is considered to be out-of-policy (OOP), and traffic may be redirected to other available links accordingly in order to bring the link back in policy ("IN-POLICY").

In accordance with one aspect of the present invention, a link utilization threshold is assigned to each individual link that is, e.g., a percentage of the total capacity of the link, an absolute bandwidth value, etc. For example, a 100 Kilobytes per second (KBps) link (e.g., Link 1) may have a link policy assigned as a 75% link utilization threshold, a 75 KBps link utilization threshold, etc. Also, when policies are applied to more than one link, different thresholds may be assigned to each of the links accordingly. For instance, a second link (e.g., an 80 KBps link, Link 2) may have an 80% link utilization threshold. Those skilled in the art will appreciate a common percentage may be assigned to multiple links of varying bandwidth capacities, such as, e.g., assigning a 75% link utilization threshold to both the 100 KBps link and 80 KBps link.

FIG. 3 is an exemplary link policy table 300 that may be used in accordance with the present invention. Table 300 is illustratively stored in memory 240 and includes one or more entries 320, each comprising a plurality of fields for storing a link identification (ID) 305, a link utilization threshold 310, and load balanced links 315 that indicates with which other links the link ID 305 may be associated (described below). The table 300 is illustratively maintained and managed by OER/Master OER process 246. Those skilled in the art will understand that while a table is shown and described herein, other known data structures may be used in accordance with the present invention. Also, other link policy configurations, fields, link relations (e.g., load balanced links), and values may be defined, as will be understood by those skilled in the art, and the table 300 as shown is merely representative.

Link utilization may be monitored by various means, for example, by OER/Master OER process 246 described above. Alternatively, each node of a network configured for link policy-based routing may also monitor link utilization for its links by available monitoring processes, such as, e.g., Net-Flow™ by Cisco Systems, Inc. Notably, the process of monitoring may be configured (e.g., by a system administrator) to be periodic as needed, such as, e.g., every 30 seconds, or continuous for faster response time. By comparing the monitored link utilization to the assigned thresholds (e.g., by OER process 246), it can be determined that the link is OOP in the event the link utilization surpasses the threshold.

Once a link is OOP, excess utilization for the OOP link may be reduced by changing the routes of one or more selected prefixes, i.e., to use other available links. Illustratively, e.g., by using OER process 246, a bandwidth utilization per prefix may be obtained by specifically monitoring traffic flow to/from each of the prefixes (e.g., using NetFlow™). With knowledge of per prefix bandwidth utilization, it is possible to determine which prefix(es) to optimally redirect based on the utilization of the prefix and the excess link utilization as a whole. For example, if the excess utilization of an OOP link is 10 KBps, and a particular prefix is utilizing 10 KBps of bandwidth of that link, it may be beneficial to move that one particular prefix to another available link. Similarly, two prefixes with a bandwidth utilization sum of 10 KBps (or greater) may be used, or three prefixes totaling 10 KBps, etc. While it feasible to move portions of a prefix or randomly selected traffic to another available link, a benefit of redirecting an entire prefix is that all traffic flowing to the particular prefix(es) will be redirected over the same link. As will be understood by those skilled in the art, this provides various advantages, such as, e.g., reduced routing complexity.

The prefix routes may be redirected until the OOP link is returned to an IN-POLICY state, e.g., at or below the link utilization threshold. A configurable amount below the threshold may be put into effect by a system administrator such that once the link is considered to be OOP, the traffic is redirected until the link utilization of the OOP link is at least the configurable amount below the threshold. In this manner, the previously OOP link is less likely to quickly surpass the link utilization threshold and become OOP again due to increased traffic flow over a short time.

As will be understood by those skilled in the art, it is important to ensure that by redirecting traffic to other links, those other links do not become OOP as well. If those links were to become OOP, undesirable network oscillations and/or churn may result as the traffic is redirected from one OOP link to another OOP link. By first confirming that the newly redirected traffic does not force another available link to become OOP, such undesirable outcomes may be obviated. Notably, in the event that there are no available links that would not become OOP (i.e., all available links are already OOP), traffic may not be redirected anywhere, and an error may be returned to the system, such that a system administrator may take corrective action (e.g., raise thresholds or add bandwidth). Also, care may be taken so as to avoid "blackholing" prefixes, as will be understood by those skilled in the art. Blackholing, generally, is a term of art that denotes traffic that is lost en route to a destination, such as, e.g., when the destination prefix is not reachable over the path selected. Therefore, by first ensuring that the destination is reachable by the other available links prior to transferring traffic to reduce the OOP link utilization, blackholing of the traffic may be avoided.

As an example, FIGS. 4A-4B are graphical representations of link utilization and link policy for individual links in accordance with the present invention. Referring again to FIG. 3, Link 1 (e.g., 100 KBps) and Link 2 (e.g., 80 KBps) have link utilization thresholds of 75% and 80%, respectively. Assume, as in FIG. 4A, that Link 1 has a utilization of 80% (80 KBps), and Link 2 has a utilization of 40% (32 KBps). Here, Link 1 is OOP with 5% (5 KBps) excess traffic above the utilization threshold. According to the present invention, one or more prefixes with a total bandwidth utilization of 5 KBps (or more) are selected to be redirected over one or more other available links, e.g., Link 2. Illustratively, as shown in FIG. 4B, one or more prefixes totaling 12 KBps of utilization are redirected from OOP Link 1 to available Link 2. The 12 KBps may be selected because of a configurable amount below the threshold that is needed to bring the OOP link IN-POLICY, or because the smallest prefix to be redirected had a bandwidth utilization of 12 KBps, etc. Upon redirecting the traffic, the link utilizations for Link 1 and Link 2 are now 68% (68 KBps) and 55% (44 KBps), respectively, both under their assigned link utilization thresholds. Those skilled in the art will understand that FIGS. 4A and 4B are merely representative example, and that other values and configurations may be used in accordance with the present invention.

In accordance with another aspect of the present invention, a load balancing link utilization threshold (or range) is assigned to one or more links, wherein the threshold is with regards to the link utilization of one or more other selected links ("load balanced links"). The load balancing link utilization threshold may be configured as, e.g., a percent difference between load balanced links or an absolute bandwidth difference. For example, these differences may be embodied as a percentage of link capacity greater than the percentage of another load balanced link by a configurable percentage, an absolute amount of bandwidth that is greater than the absolute amount of bandwidth of another load balanced link by a configurable percentage (or absolute amount), etc. The load balancing link utilization is monitored as described above, and again, if the utilization surpasses the threshold for a link, that link is considered to be OOP, and prefix routes may be changed accordingly.

Optionally, the route changes may be configured to bring the link utilization of the selected load balanced links as close to equal/proportional as desired (e.g., percent usage or absolute bandwidth), or instead configured to simply reduce the difference to below the configured threshold. For instance, once the link is considered OOP, traffic on the one or more selected load balanced links, including the OOP link, may be readjusted to equalize the load distribution (e.g., either in absolute bandwidth or proportional percentages), i.e., to the same percentage or bandwidth. Those skilled in the art will understand that other readjusting means are possible, such as lowering the difference between link utilization to a configurable amount below the load balancing link utilization threshold, as mentioned above. Also, as mentioned above, it is important to ensure that by redirecting traffic to other load balanced links, that those other links do not become OOP as well.

Figure 5C:
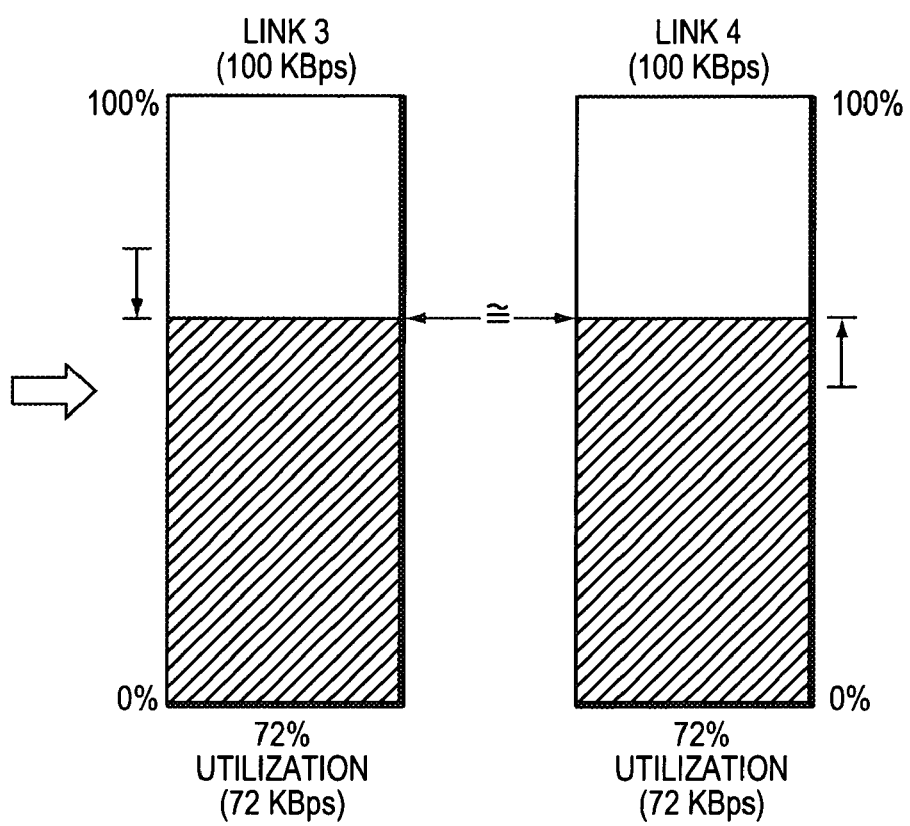

As an example, FIGS. 5A-5C are graphical representations of link utilization and link policy for load balanced links in accordance with the present invention. Referring again to FIG. 3, Link 3 (e.g., 100 KBps) and Link 4 (e.g., 100 KBps) both have load balancing link utilization thresholds of no more than 20% greater than the other load balanced link. Assume, as in FIG. 5A, that Link 3 has a utilization of 84% (84 KBps), and Link 4 has a utilization of 60% (60 KBps). Here, Link 3 has a link utilization that is greater than Link 4 by 24%. In other words, Link 3 is OOP by 4% (4 KBps) excess traffic above the load balancing link utilization threshold. According to the present invention, one or more prefixes with a total bandwidth utilization of 2 KBps (or more) are selected to be redirected over one or more other available load balanced links, e.g., Link 4. Those skilled in the art will appreciate that 4 KBps of excess utilization requires that half of the excess traffic (in the case of two load balanced links) be redirected, i.e., 2 KBps. Illustratively, as shown in FIG. 5B, one or more prefixes totaling 2 KBps of utilization are redirected from OOP Link 3 to load balanced Link 4, thus reducing the difference to within the threshold, 20%. Upon redirecting the traffic, the link utilization for Link 3 and Link 4 are now 82% (82 KBps) and 62% (62 KBps), respectively, which is within the load balancing link utilization threshold. Briefly, FIG. 5C shows a configuration where the OOP Link 3 triggers the redirection of traffic that brings the load balanced links to an equal/proportional value (i.e., a difference of 0%), as mentioned above. Here, 12 KBps of traffic is redirected from Link 3 to Link 4, such that both load balanced links have equal link utilization of 72% (72 KBps). Those skilled in the art will understand that FIGS. 5A, 5B, and 5C are merely representative example, and that other values and configurations may be used in accordance with the present invention.

With further reference again to FIG. 3, entries 320 for Link N and Link X (not shown in FIG. 1) represent one or more possible link policy configurations not discussed in detail above. Those skilled in the art will understand that still other configurations and values may be used in accordance with the present invention, and that any configurations and values described herein are merely representative. For example, entries for Link N demonstrate that more than one entry for each Link ID 305 may be within the table 300. For instance, an individual link utilization threshold of 85 KBps may be assigned to Link N, as well as a load balancing link utilization threshold of no more than 20% greater than either load balanced Link Y or Z (also not shown). Still, Link N may also be separately load balanced with a Link X (not shown), e.g., by not more than 15 KBps greater than Link X, while Link X may be assigned a different load balancing link utilization threshold with regard to Link N, e.g., by not more than 25% greater than Link N. Again, these references are meant to be further examples of possible link policy configurations, and are not meant to be limiting on the scope of the present invention.

Notably, in addition to percentages, differences, and absolute values as described above, the link utilization threshold of the present invention may also be set as a relative link utilization policy, where a configurable increase (e.g., a spike or slow increase) in link utilization or in the difference of link utilizations between two load balanced links triggers an OOP event. Relative policies are described in detail in commonly-owned copending U.S. patent application Ser. No. 11/239,613, entitled TECHNIQUE FOR MAINTAINING AND ENFORCING RELATIVE POLICIES WITH THRESHOLDS, filed by Xia et al. on Sep. 29, 2005, the contents of which are hereby incorporated in its entirety.

Also, a minimum threshold may be assigned to a link in order to prevent under-utilization of the link, which may be beneficial under certain circumstances that will be understood by those skilled in the art. For example, a system administrator may wish to more evenly distribute link utilization among a plurality of links, e.g., such as during load balancing traffic. By placing a minimum threshold on the links (e.g., 20%), a link would be considered OOP if not enough traffic were utilizing that link. Thus, to bring the link back IN-POLICY, traffic would be redirected onto the link from other links.

Figure 6:
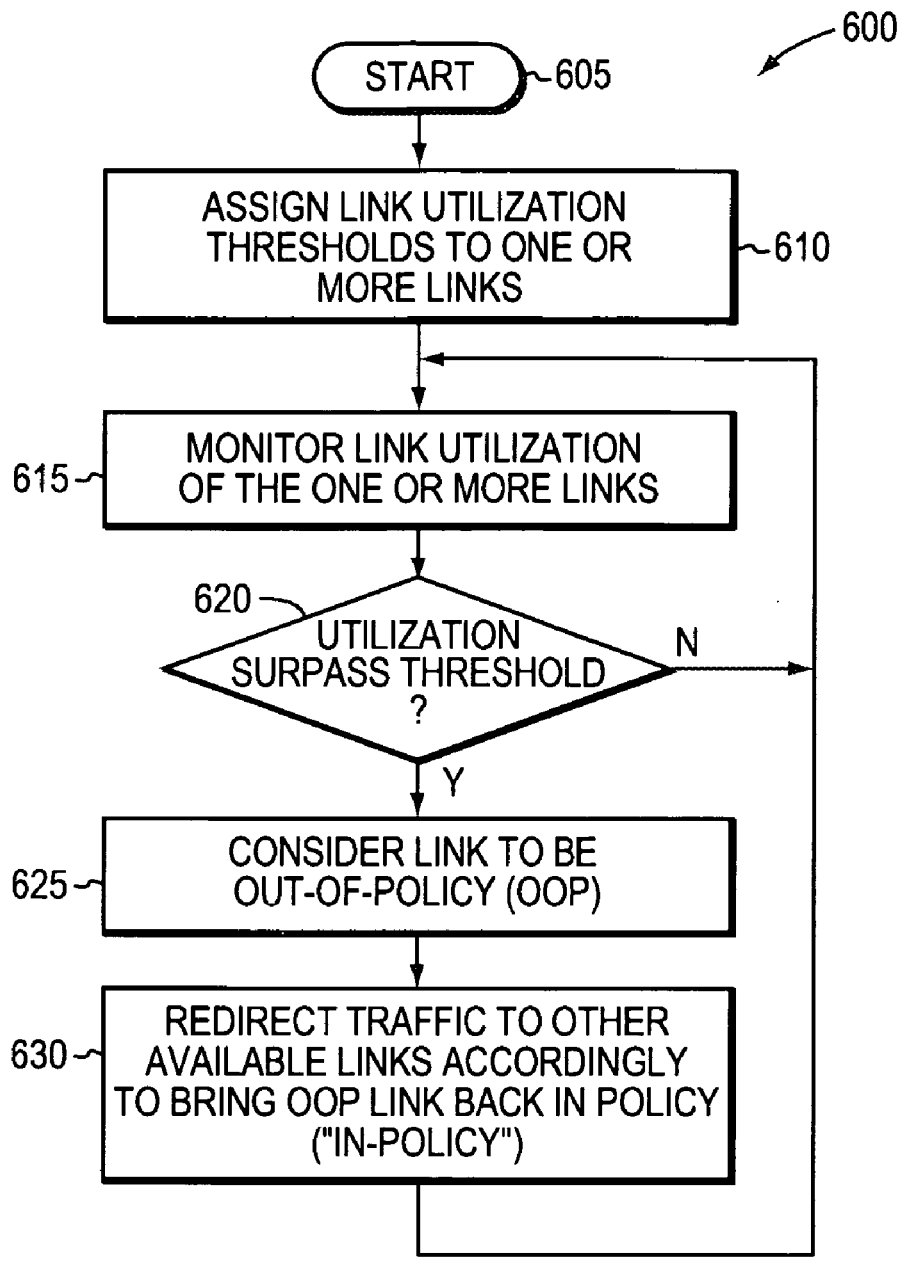
FIG. 6 is a flowchart illustrating a procedure for dynamically applying a link utilization based policy to traffic traversing links in accordance with the present invention.

FIG. 6 is a flowchart illustrating a procedure for dynamically applying a link utilization based policy to traffic traversing links in accordance with the present invention. The procedure 600 starts at step 605, and continues to step 610, where link utilization thresholds are assigned to one or more links (e.g., a percentage, absolute value, or difference, as described above). Once the thresholds are established, the link utilization of the one or more links is monitored at step 615, such as, e.g., by OER process 246. As mentioned above, the monitoring may be continuous or periodic, depending upon configuration. If the utilization does not surpass the assigned threshold for a particular link at step 620, the link utilization continues to be monitored at step 615. If, on the other hand, the link utilization does surpass the assigned threshold at step 620, the link is considered to be OOP in step 625. Upon considering the link OOP, traffic may then be redirected to other available links accordingly to bring the OOP link back IN-POLICY. Notably, for load-balanced traffic, IN-POLICY may require a difference less than a configurable amount, or simply a difference below the threshold, as described above. Further, as mentioned above, measures may be taken to ensure that other links do not surpass their utilization thresholds during the redirection, and to ensure that no prefixes are "blackholed." The procedure may then return to step 615 to continue monitoring the link utilization of the one or more links.

Advantageously, the novel technique dynamically applies a link utilization based policy to traffic traversing links in a computer network. By defining link utilization thresholds, the novel technique dynamically prevents a link from reaching its utilization capacity, thus reducing the number of dropped packets and delay over the links. Also, by defining load balancing thresholds, the novel technique may proportionally load balance traffic based on link capacity, especially in the case where links have unequal capacities, where other current methods fail. Further, the novel technique is adaptive to the flow of traffic and does not depend upon traditional (and often cumbersome) routing techniques to load balance traffic among a plurality of unequal links (e.g., in capacity and/or cost).

While there has been shown and described an illustrative embodiment that dynamically applies a link utilization based policy to traffic traversing links in a computer network, it is to be understood that various other adaptations and modifications may be made within the spirit and scope of the present invention. For example, the invention has been shown and described herein illustratively using OER techniques to monitor the utilization and to redirect traffic accordingly. However, the invention in its broader sense is not so limited, and may, in fact, be used with any monitoring processes and/or route optimization techniques, as will be understood by those skilled in the art. Also, while the invention has been shown and described for applying link policies to individual links, the invention may, in fact, be used with groups of links, as described in commonly-owned copending U.S. patent application Ser. No. 11/336,734, entitled LINK GROUPING FOR ROUTE OPTIMIZATION, filed by Shah on Jan. 20, 2006, the contents of which are hereby incorporated in its entirety. Further, those skilled in the art will understand that the term "link" as used herein may indicate either a physical link or virtual link.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method for dynamically applying a link utilization based policy to traffic traversing a plurality of links in a computer network, the method comprising:
   assigning a link utilization threshold to a first link of the plurality of links, the link utilization threshold embodied as a particular difference between a measure of link utilization of the first link and a measure of link utilization of one or more second links of the plurality of links;
   monitoring, by a processor, the link utilization of the first link and the one or more second links;
   monitoring, by the processor, bandwidth utilization of a plurality of prefixes reached over the first link;
   considering the first link to be out-of-policy (OOP) in the event that a difference between the measure of link utilization of the first link and the measure of link utilization of one or more second links surpasses the link utilization threshold; and
   in response to the link utilization threshold being surpassed,
      determining one or more selected prefixes, from the plurality of prefixes, whose collective bandwidth utilization is greater than an amount the link utilization threshold is surpassed, and
      changing a route for the one or more selected prefixes to redirect traffic from a first network interface operably connected to the first link to one or more second network interface operably connected to other available links in order to reduce the link utilization of the first link to cause the difference between the measure of link utilization of the first link and the measure of link utilization of the one or more second links to be equal to or below the link utilization threshold.

2. The method as in claim 1 wherein the measure of link utilization of the first link and the measure of link utilization of the one or more second links are each selected from a group consisting of: a percentage of link utilization capacity of the link, and an absolute value of link utilization of the link.

3. The method as in claim 1, wherein the particular difference between the measure of link utilization of the first link and the measure of link utilization of the one or more second links is selected from a group consisting of: a percent difference between a percentage of link utilization of the first link and a percentage of link utilization of the one or more second links, a percent difference between an absolute value of link utilization of the first link and absolute values of link utilization of the one or more second links, and an absolute difference between an absolute value of link utilization of the first link and absolute values of link utilization of the one or more second links.

4. The method as in claim 1, further comprising:
   redirecting traffic until the measure of link utilization of the first link is within a configurable difference of the measure of link utilization of the one or more second links.

5. The method as in claim 1, further comprising:
   redirecting traffic until the measure of link utilization of the first link is at least one of either substantially equal to the measure of link utilization of the one or more second links or proportional with the measure of link utilization of the one or more second links based on the link capacities of the one or more second links.

6. The method as in claim 1, further comprising:
   redirecting traffic until the first link is in policy.

7. The method as in claim 1, wherein the first link is one of a plurality of first links that have associated link utilization thresholds, and the method further comprises:
   assigning a different link utilization threshold to each of the plurality of first links.

8. The method as in claim 1, further comprising:
   redirecting traffic for the one or more selected prefixes to other available links, wherein each of the one or more selected prefixes traverses only one link after redirection.

9. The method as in claim 1, further comprising:
configuring at least one of the steps of assigning, monitoring, considering, and changing to be performed by an optimized edge routing (OER) process.

10. The method as in claim 1, further comprising:
configuring the monitoring of the link utilization to operate as one of either continuously or periodically.

11. The method as in claim 1, further comprising:
ensuring that redirected traffic is not blackholed.

12. The method as in claim 1, further comprising:
assigning a link utilization threshold that is a minimum threshold.

13. The method as in claim 1, wherein one or more of the one or more second links is a link group.

14. A node for dynamically applying a link utilization based policy to traffic traversing a plurality of links in a computer network, the node comprising:
one or more network interfaces;
a processor coupled to the one or more network interfaces and adapted to execute software processes; and
a memory adapted to store an optimized edge routing (OER) process executable by the processor, the OER process configured to: i) assign a link utilization threshold to a first link of the plurality of links, the link utilization threshold embodied as a particular difference between a measure of link utilization of the first link and a measure of link utilization of one or more second links of the plurality of links, ii) monitor the link utilization of the first link and the one or more second links, iii) monitor bandwidth utilization of a plurality of prefixes reached over the first link, iv) consider the first link to be out-of-policy (OOP) in the event that a difference between the measure of link utilization of the first link and the measure of link utilization of one or more second links surpasses the link utilization threshold, and v) in response to the link utilization threshold being surpassed, determine one or more selected prefixes, from the plurality of prefixes, whose collective bandwidth utilization is greater than an amount the link utilization threshold is surpassed, and change a route for the one or more selected prefixes to redirect traffic from the first link to other available links in order to reduce the link utilization of the first link to cause the difference between the measure of link utilization of the first link and the measure of link utilization of the one or more second links to be equal to or below the link utilization threshold.

15. An apparatus for dynamically applying a link utilization based policy to traffic traversing links in a computer network, the apparatus comprising:
means for assigning a link utilization threshold to a first link of the plurality of links, the link utilization threshold embodied as a particular difference between a measure of link utilization of the first link and a measure of link utilization of one or more second links of the plurality of links;
means for monitoring the link utilization of the first link and the one or more second links;
means for monitoring bandwidth utilization of a plurality of prefixes reached over the first link;
means for considering the first link to be out-of-policy (OOP) in the event that a difference between the measure of link utilization of the first link and the measure of link utilization of one or more second links surpasses the link utilization threshold;
means for determining one or more selected prefixes, from the plurality of prefixes, whose collective bandwidth utilization is greater than an amount the link utilization threshold is surpassed; and
means for changing a route for the one or more selected prefixes to redirect traffic from the first link to other available links in order to reduce the link utilization of the first link to cause the difference between the measure of link utilization of the first link and the measure of link utilization of the one or more second links to be equal to or below the link utilization threshold, in response to the link utilization threshold being surpassed.

16. The node as in claim 14 wherein the particular difference between the measure of link utilization of the first link and the measure of link utilization of the one or more second links are each selected from a group consisting of: a percentage of link utilization capacity of the link, and an absolute value of link utilization of the link.

17. The node as in claim 14 wherein the particular difference between the measure of link utilization of the first link and the measure of link utilization of the one or more second links is selected from a group consisting of: a percent difference between a percentage of link utilization of the first link and a percentage of link utilization of the one or more second links, a percent difference between an absolute value of link utilization of the first link and absolute values of link utilization of the one or more second links, and an absolute difference between an absolute value of link utilization of the first link and absolute values of link utilization of the one or more second links.

18. The method of claim 1, wherein the other available links are the one or more second links.

19. The node as in claim 14 wherein the other available links are the one or more second links.

* * * * *

UNITED STATES PATENT AND TRADEMARK OFFICE
CERTIFICATE OF CORRECTION

| | | |
|---|---|---|
| PATENT NO. | : 8,203,954 B1 | |
| APPLICATION NO. | : 11/337217 | |
| DATED | : June 19, 2012 | |
| INVENTOR(S) | : Rahul G. Patel | |

It is certified that error appears in the above-identified patent and that said Letters Patent is hereby corrected as shown below:

Col. 2, line 30-31 should read: "associated a distance metric ~~is~~ with each of its interconnected nodes"

Signed and Sealed this
Fourth Day of September, 2012

David J. Kappos
*Director of the United States Patent and Trademark Office*